(12) United States Patent
Shie

(10) Patent No.: US 7,782,411 B2
(45) Date of Patent: Aug. 24, 2010

(54) LIQUID CRYSTAL DISPLAY HAVING PROTECTION LINE

(75) Inventor: De-Ching Shie, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 396 days.

(21) Appl. No.: 12/011,971

(22) Filed: Jan. 29, 2008

(65) Prior Publication Data
US 2008/0180591 A1 Jul. 31, 2008

(30) Foreign Application Priority Data
Jan. 29, 2007 (TW) .............................. 96103214 A

(51) Int. Cl.
*G02F 1/1333* (2006.01)
(52) U.S. Cl. ........................................ 349/40; 349/139
(58) Field of Classification Search ................... 349/40, 349/139
See application file for complete search history.

(56) References Cited

U.S. PATENT DOCUMENTS 6,690,433 B2   2/2004  Yoo et al.
7,158,194 B2   1/2007  Lo et al.
7,532,264 B2 * 5/2009  Yuan et al. .................... 349/40
2005/0078232 A1 4/2005 Lo et al.
2006/0092591 A1 5/2006 Yuan et al.

FOREIGN PATENT DOCUMENTS

JP   10-148840 A   6/1998
TW   I229440 B     3/2005

* cited by examiner

*Primary Examiner*—Jerry T Rahll
(74) *Attorney, Agent, or Firm*—Wei Te Chung

(57) ABSTRACT

An exemplary liquid crystal display (200) includes a liquid crystal panel (210), a driver (280), and a flexible printed circuit board (220). The liquid crystal panel includes an active area (230) and a peripheral non-active area. The driver is configured to drive the liquid crystal panel. The flexible printed circuit board includes at least one the ground line (222) electrically coupled to the ground. The non-active area includes an electrostatic guiding line (240) and a protection line (270). The electrostatic guiding line surrounds the active area, and is electrically coupled to the at least one the ground line via the driver. The protection line surrounds the electrostatic guiding line, and electrically coupled to the at least one the ground line directly.

19 Claims, 4 Drawing Sheets

LIQUID CRYSTAL DISPLAY HAVING PROTECTION LINE

FIELD OF THE INVENTION

The present invention relates to liquid crystal displays (LCDs), and more particularly to an LCD having a protection line. The protection line can be used for protecting a driver of the LCD when an electrostatic discharge (ESD) phenomenon takes place in the LCD.

GENERAL BACKTHE GROUND

LCDs are commonly used as display devices for compact electronic apparatuses, because they not only are very thin but also provide good quality images with little power consumption.

During an LCD manufacturing process, electrostatic charges may be generated in the LCD. Electrostatic charges may also enter the LCD from exterior objects when the exterior objects contact the LCD, for example, the electrostatic charges may be transmitted to the LCD via a so-called human body mode (HBM) when the LCD is under an operation by the user. If too many electrostatic charges build up at any one location on the LCD, these electrostatic charges are liable to discharge, so as to form an ESD phenomenon. The ESD phenomenon may damage or destroy internal components of the LCD such as metal signal lines, thin film transistors (TFTs), or the like. Thus it is necessary to provide an ESD guiding path in the LCD, such that the electrostatic charges can discharge in a timely and safe manner.

FIG. 6 is an abbreviated, planar view of a conventional LCD. The LCD 100 includes a liquid crystal panel 110, a driver 180, and a flexible printed circuit board (FPCB) 120. The liquid crystal panel 110 includes an active area 130 and a non-active area (not labeled). The non-active area surrounds the active area 130, and includes an electrostatic guiding line 140. The electrostatic guiding line 140 surrounds the active area 130, and is configured to provide an ESD path for electrostatic charging of the active area 130. The FPCB 120 includes a plurality of lines 122 electrically coupled to the driver 180. One of the lines 122 is electrically coupled to the ground and used as a ground line. The driver 180 is configured to drive the liquid crystal panel 110 to display images, and is disposed at the non-active area of the liquid crystal panel 110. The driver 180 includes two electrostatic charge input pins (not labeled) and an electrostatic charge output pin (not labeled). Each electrostatic charge input pin is electrically coupled to a respective end of the electrostatic guiding line 140, and the electrostatic charge output pin is electrically coupled to the ground line 122 of the FPCB 120.

When an ESD phenomenon takes place in the LCD 100, a plurality of electrostatic charges in the active area 130 of the liquid crystal panel 110 discharge toward the electrostatic guiding line 140. The electrostatic charges are transmitted to the electrostatic charge input pins of the driver 180 via the electrostatic guiding line 140 and pass through the driver 180, and then are released to the ground via both the electrostatic charge output pin and the ground line 122. Therefore, an ESD guiding path is formed between the active area 130 and the ground, and the electrostatic charges in the active area 130 can be released to the ground via the ESD guiding path.

However, the electrostatic charges need to pass through the driver 180 during the discharge process of the LCD 100. Due to a tendency of compactness of the driver 180, inner signal lines of the driver 180 become thinner. When the electrostatic charges pass through the driver 180, the thinner inner signal lines are liable to be damaged or even destroyed due to the electrical overstress (EOS) induced by the electrostatic charges. Once the inner signal lines of the driver 180 are destroyed, the ESD guiding path of the LCD 100 is cut off. This may cause the electrostatic charges to discharge in an unsafe manner, and further causes the elements of the liquid crystal panel 110 to be destroyed. Accordingly, the reliability of the LCD 100 is low.

It is, therefore, desired to provide an LCD which overcomes the above-described deficiencies.

SUMMARY

In a first aspect, a liquid crystal display includes a liquid crystal panel, a driver, and a flexible printed circuit board. The liquid crystal panel includes an active area and a peripheral non-active area. The driver is configured to drive the liquid crystal panel. The flexible printed circuit board includes at least one the ground line electrically coupled to the ground. The non-active area includes an electrostatic guiding line and a protection line. The electrostatic guiding line surrounds the active area, and is electrically coupled to the at least one the ground line via the driver. The protection line surrounds the electrostatic guiding line, and electrically coupled to the at least one the ground line directly.

In a second aspect, a liquid crystal display includes a liquid crystal panel, a driver, and a flexible printed circuit board. The liquid crystal panel includes an electrostatic guiding line and a protection line. The driver is configured to drive the liquid crystal panel. The flexible printed circuit board includes at least one the ground line electrically coupled to the ground. The electrostatic guiding line and the protection line are both configured for discharging electrostatic charges in the liquid crystal panel. When the electrostatic charges are discharged, part of the electrostatic charges are transmitted to the at least one the ground line via the protection line and released to the ground; part of the electrostatic charges are transmitted to the at least one the ground line via both the electrostatic guiding line and are released to the ground.

Other novel features and advantages will become more apparent from the following detailed description when taken in conjunction with the accompanying drawings. In the drawing, all the views are schematic.

DETAILED DESCRIPTION OF PREFERRED EMBODIMENTS

Reference will now be made to the drawings to describe a preferred and exemplary embodiment of the present invention in detail.

Figure 1:
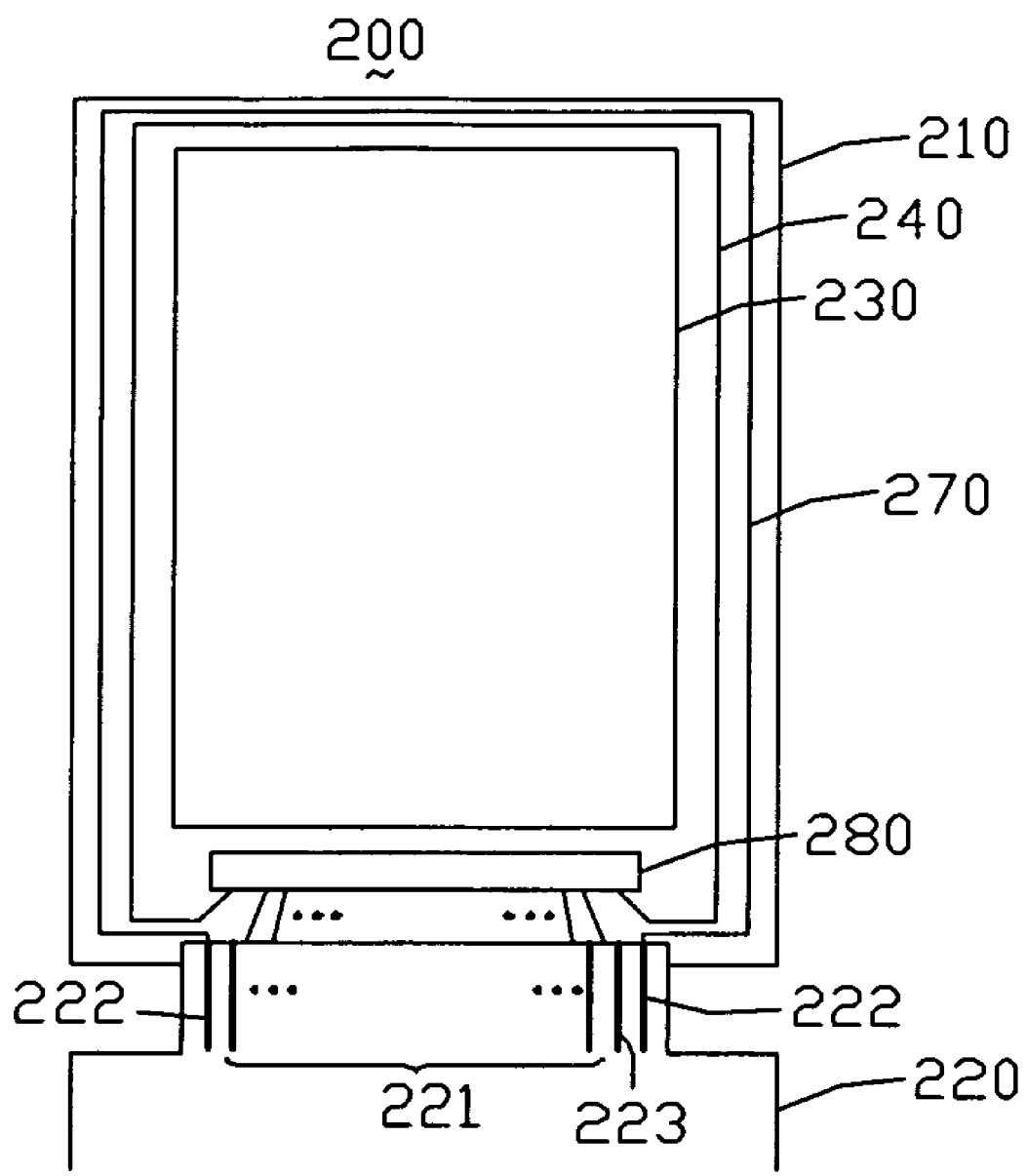
FIG. 1 is an abbreviated, planar view of a liquid crystal display according to a first embodiment of the present invention, the liquid crystal display including a liquid crystal panel having an active area, an electrostatic guiding line, and a protection line; the electrostatic guiding line and the protection line cooperatively forming an electrostatic discharge assistant structure.

FIG. 1 is an abbreviated, planar view of an LCD 200 according to a first embodiment of the present invention. The LCD 200 includes a liquid crystal panel 210, a driver 280, and a flexible printed circuit board (FPCB) 220.

The liquid crystal panel 210 includes a main central active area 230 and a peripheral non-active area (not labeled). The active area 230 is configured for a display area at which images displayed by the liquid crystal display 200 can be seen. The non-active area includes an electrostatic guiding line 240 and a protection line 270. The electrostatic guiding line 240 surrounds the active area 230, and the protection line 270 surrounds the electrostatic guiding line 240. The electrostatic guiding line 240 and the protection line 270 are both configured for providing ESD paths to release electrostatic charges in the liquid crystal panel 210. The protection line 270, together with the electrostatic guiding line 240, form an electrostatic discharge (ESD) assistant structure (not labeled) cooperatively.

The driver 280 is configured to drive the liquid crystal panel 210 to display images, and is disposed at the non-active area of the liquid crystal panel 210. The driver 280 includes a plurality of pins (not labeled). A pair of the pins are configured for electrostatic charge input pins, and each of the electrostatic charge input pins is electrically coupled to a respective end of the electrostatic guiding line 240. One of the other pins of the driver 280 is configured for an electrostatic charge output pin, and is electrically coupled to the FPCB 220.

The FPCB 220 is attached to a region adjacent to an edge of the liquid crystal panel 210 via an anisotropic conductive film (ACF), and this edge corresponds to the position where the driver 280 locates. The FPCB 220 includes a plurality of lines disposed in parallel. Each of the outmost lines is configured for a first ground line 222, and is electrically coupled to a respective end of the protection line 270. A line adjacent to one of the outmost lines is electrically coupled to the electrostatic charge output pin of the driver 280, and is also configured for a second ground line 223. Moreover, The first ground lines 222 and the second ground line 223 are all electrically coupled to the ground. The rest lines of the FPCB 220 are configured for signal lines 221, and are electrically coupled to the corresponding pins of the driver 280. The signal lines 221 are used to transmit signals between exterior driving circuits (not shown) and the driver 280.

Figure 2:
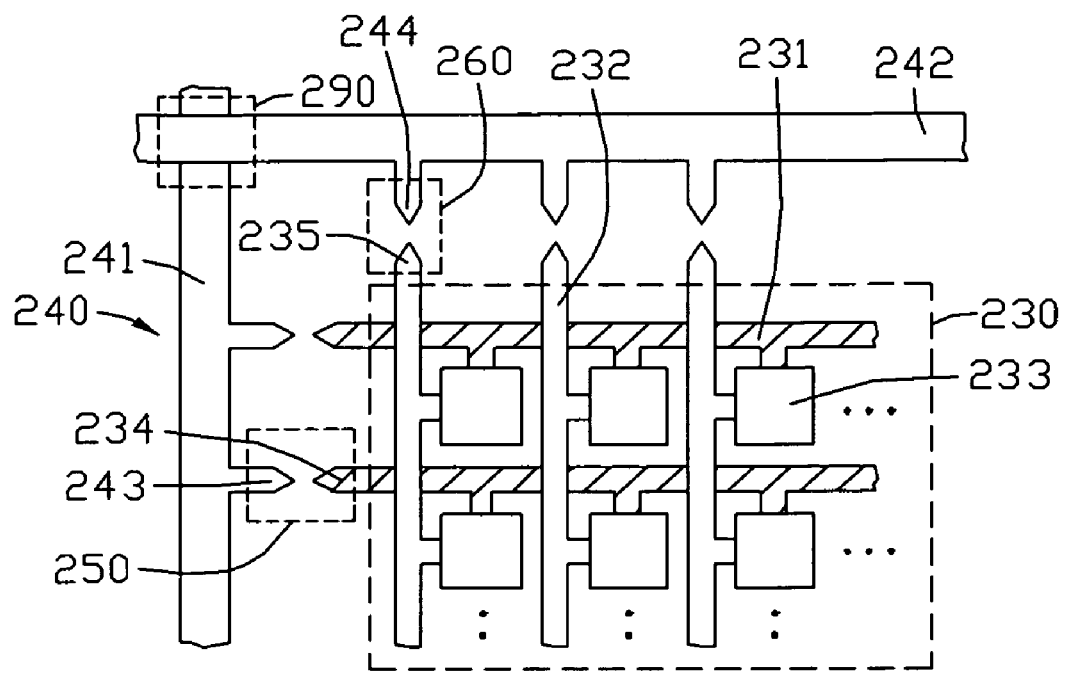
FIG. 2 is an abbreviated, enlarged view of the liquid crystal panel of the liquid crystal display of FIG. 1.

FIG. 2 is an abbreviated, enlarged view of the liquid crystal panel 210 of the liquid crystal display 200. The active area 230 includes a plurality of scanning lines 231, a plurality of data lines 232, and a plurality of pixel units 233. The scanning lines 231 are parallel, and are configured for transmitting scanning signals outputted by the driver 280. Each of the scanning lines 231 includes a first cusp end 234. The first cusp end 234 extends to the non-active area, and is used to accumulate electrostatic charges in the corresponding scanning line 231. The data lines 232 are perpendicular to the scanning line 231, and are insulated from the scanning line 231 via an insulating layer (not shown). The data lines 232 are configured for transmitting data signals outputted by the driver 280. Each of the data lines 232 includes a second cusp end 235. The second cusp end 235 also extends to the non-active area, and is also used to accumulate electrostatic charges in the corresponding data line 232. The pixel units 233 are defined by the crossing scanning lines 231 and data lines 232. Each of the pixel units 233 is electrically coupled to a corresponding scanning line 231 and a corresponding data line 232 for receiving the scanning signals and data signals.

The electrostatic guiding line 240 includes a first guiding portion 241 and a second guiding portion 242, both of which can be made of metal or indium tin oxide (ITO). The first guiding portion 241 includes a first main body and a plurality of first extending portions. The first extending portions perpendicularly extend from the first main body alternately, so as to form a comb-like manner. Each first extending portion corresponds to a respective scanning line 231, and includes a third cusp end 243. The third cusp end 243 faces to the first cusp end 234 of the corresponding scanning line 231 accurately, such that a narrow gap (not labeled) is formed therebetween. Moreover, each pair of the first and third cusp ends 234, 243 forms a first discharge region 250 cooperatively.

The second guiding portion 242 also has a comb-like manner, which includes a second main body, and a plurality of second extending portions perpendicularly extend from the second main body alternately. Each second extending portion of the second guiding portion 242 corresponds to a respective data line 232, and includes a fourth cusp end 244. The fourth cusp end 244 faces to the second cusp 235 of the corresponding data line 232 accurately, such that a narrow gap is formed therebetween. Each pair of the second and fourth cusp ends 235, 244 form a second discharge region 260 cooperatively.

Moreover, one end of the second guiding portion 242 superposes a corresponding end of the first guiding portion 241, with the insulating layer sandwiched therebetween. Thereby, a superposition area 290 is formed. Moreover, the insulating layer includes a through hole (not shown) disposed in the superposition area 290, and the first guiding portion 241 is electrically coupled to the second guiding portion 242 via the through hole. The other end (not shown) of the second guiding portion 242 is electrically coupled to a third guiding portion (not shown) of the electrostatic guiding line 240. The third guiding portion is a line disposed at a position corresponding to an opposite side of the first guiding portion 241. Furthermore, the first guiding portion 241 and the third guiding portion are electrically coupled to the corresponding electrostatic charge input pins of the driver 280 respectively.

Figure 3:
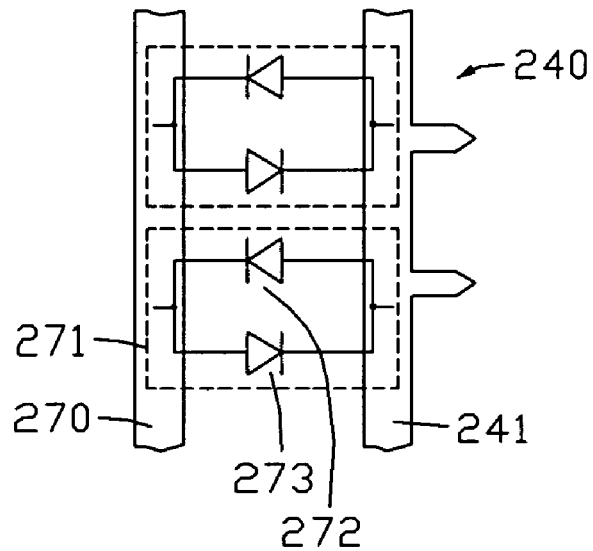
FIG. 3 is an abbreviated, enlarged view of the electrostatic discharge assistant structure of the liquid crystal panel of the liquid crystal display of FIG. 1.

Referring also to FIG. 3, a portion of the ESD assistant structure corresponding the first guiding portion 241 is taken as an example. In the ESD assistant structure, the protection line 270 is parallel to the first main body of the first guiding portion 241 of the electrostatic guiding line 240, and is disposed at an opposite side of the first extending portions 241. Moreover, a gap is formed between the electrostatic guiding line 240 and the protection line 270.

Moreover, a plurality of ESD assistant units 271 are alternately disposed at the gap. The ESD assistant unit 271 can be ring diodes, which includes a first diode 272 and a second diode 273. A positive terminal of the first diode 272 and a negative terminal of the second diode 273 are electrically coupled to the electrostatic guiding line 240. A negative terminal of the first diode 272 and a positive terminal of the second diode 273 are electrically coupled to the protection line 270. The ESD assistant unit 271 is configured to provide an ESD assistant path when an ESD phenomenon takes place in the liquid crystal panel 210. Moreover, the ESD assistant unit 271 can also be back-to-back diodes, metal-insulator-metal (MIM) diodes, or ring thin film transistors (TFTs).

When a large amount of electrostatic charges build up at the active area 230 of the liquid crystal panel 210, because a curvature of each of the first and second cusp ends 234, 235 is large, the electrostatic charges in the scanning line 231 are accumulated at the first cusp ends 234, and the electrostatic charges in the data line 234 are accumulated at the second cusp ends 235. Thus electrical fields are generated in the first discharge region 250 and the second discharge region 260. Once the number of electrostatic charges accumulated at the first cusp end 234 reaches a critical value, the electrical field in the corresponding first discharge region 250 is sufficiently great. The electrostatic charges at the first cusp end 234 obtain adequate energy from the electrical field. Thereby, a so-called point discharge phenomenon takes place, that is, the narrow gap in the first discharge region 250 is broken down, such that the electrostatic charges in the first cusp end 234 pass through the first discharge region 250 and enter the electrostatic guiding line 240 via the third cusp end 243. Similarly, the electrostatic charges in the second cusp end 235 also enter the electrostatic guiding line 240 via the fourth cusp end 244.

Most of the electrostatic charges in the electrostatic guiding line 240 are transmitted to the protection line 270 via the ESD assistant units 271. In detail, positive electrostatic charges are transmitted to the protection line 270 via the first diode 272, and negative electrostatic charges are transmitted to the protection line 270 via the second diode 273. These electrostatic charges are further released to the ground via the protection line 270 and the first ground lines 222 of the FPCB 220. Simultaneously, a small amount of the electrostatic charges in the electrostatic guiding line 240 are transmitted to the electrostatic charge input pins of the driver 280 and pass through the driver 280, and then are outputted to the second ground line 223 of the FPCB 220 by the electrostatic charge output pin and are released to the ground.

Moreover, when the exterior objects contact the LCD 200, exterior electrostatic charges bring by the exterior objects enter the protection line 270 first, and the exterior electrostatic charges are released to the ground directly via the protection line 270. That is, the exterior electrostatic charges are prevented from entering the active area 230 of the liquid crystal panel 210 by the protection line 270.

In summary, in the LCD 200, the protection line 270 is disposed surrounding the electrostatic guiding line 240, and forms the ESD assistant structure together with the electrostatic guiding line 240. When an ESD phenomenon takes place, most of the electrostatic charges are released to the ground via protection line 270 directly, and only a few electrostatic charges are released to the ground via the driver 280. That is, a new discharge path is provided by the ESD assistant structure, this new discharge path is capable of transmitting most of the electrostatic charges, such that the amount of electrostatic charges being discharged via passing through the driver 280 is reduced. Accordingly electrical overstress (EOS) induced by the electrostatic charges passing through the driver 280 is reduced, thus these electrostatic charges cannot damage inner signal lines of the driver 280. Therefore, the electrostatic charges in the LCD 200 can be discharged in a safe manner, and the reliability of the LCD 200 is improved. Moreover, because the protection line 270 can prevent the exterior electrostatic charges from entering the active area 230 of the liquid crystal panel 210, the reliability of the LCD 200 can be even better.

Furthermore, in the LCD 200, the first ground lines 222 and the second ground line 223 of the FPCB 220 can also be merged to a main ground line, and this main ground line is electrically coupled to both of the electrostatic charge output pin of the driver 280 and the ends of the protection line 270. Besides, the protection line 270 can only be disposed adjacent to the first guiding portion 241 of the electrostatic guiding line 240, without surrounding the whole electrostatic guiding line 240.

Figure 4:
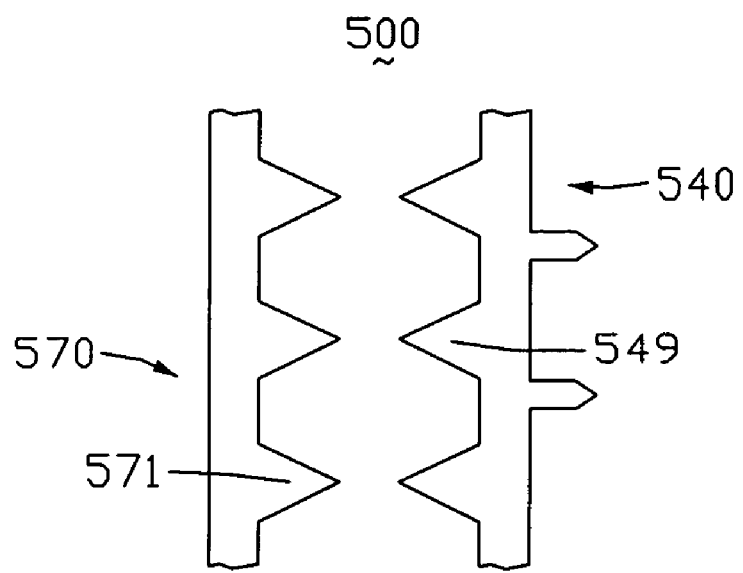
FIG. 4 is an abbreviated, enlarged view of an electrostatic discharge assistant structure of a liquid crystal display according to a second embodiment of the present invention.

FIG. 4 is an abbreviated, enlarged view of an electrostatic discharge assistant structure 500 of a liquid crystal display according to a second embodiment of the present invention. The liquid crystal display in the second embodiment is similar to the liquid crystal display 200. However, the electrostatic discharge assistant structure 500 includes an electrostatic guiding line 540 and a protection line 570. The electrostatic guiding line 540 includes a first guiding portion (not labeled). The first guiding portion includes a first main body, a plurality of first extending portions extending from the first main body toward a first direction, and a plurality of second extending portions 549 extending from the first main body toward a second direction that is opposite to the first direction. Each of the second extending portions 549 is shaped as a saw tooth having a first cusp end. The protection line 570 includes a second main body and a plurality of third extending portions 571. The second main body is parallel to the first main body of the first guiding portion. Each third extending portion 571 corresponds to a respective second extending portion 549, and extends toward the first direction. The third extending portion 579 is also shaped as a saw tooth having a second cusp end, and the second cusp end faces the corresponding first cusp end.

When electrostatic charges enter the electrostatic guiding line 540 from a liquid crystal panel, most of the electrostatic charges are accumulated at the second extending portion 549, so that electrical fields are formed between the second extending portion 549 and the third extending portion 571. Once the amount of electrostatic charges accumulated at the second extending portion 549 is sufficiently great, the electrical fields cause a point discharge phenomenon takes place. Thus the electrostatic charges are discharged to protection line 570 via the first and second cusp ends, and are released to the ground via the protection line 570.

Figure 5:
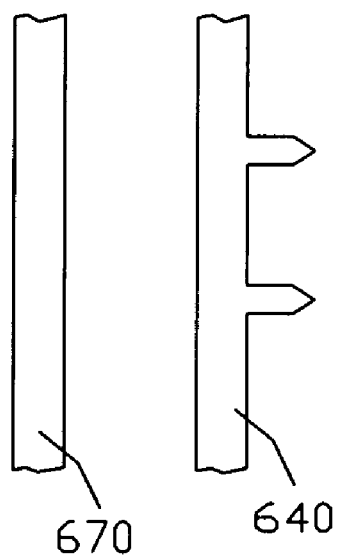
FIG. 5 is an abbreviated, enlarged view of an electrostatic discharge assistant structure of a liquid crystal display according to a third embodiment of the present invention.
Figure 6:
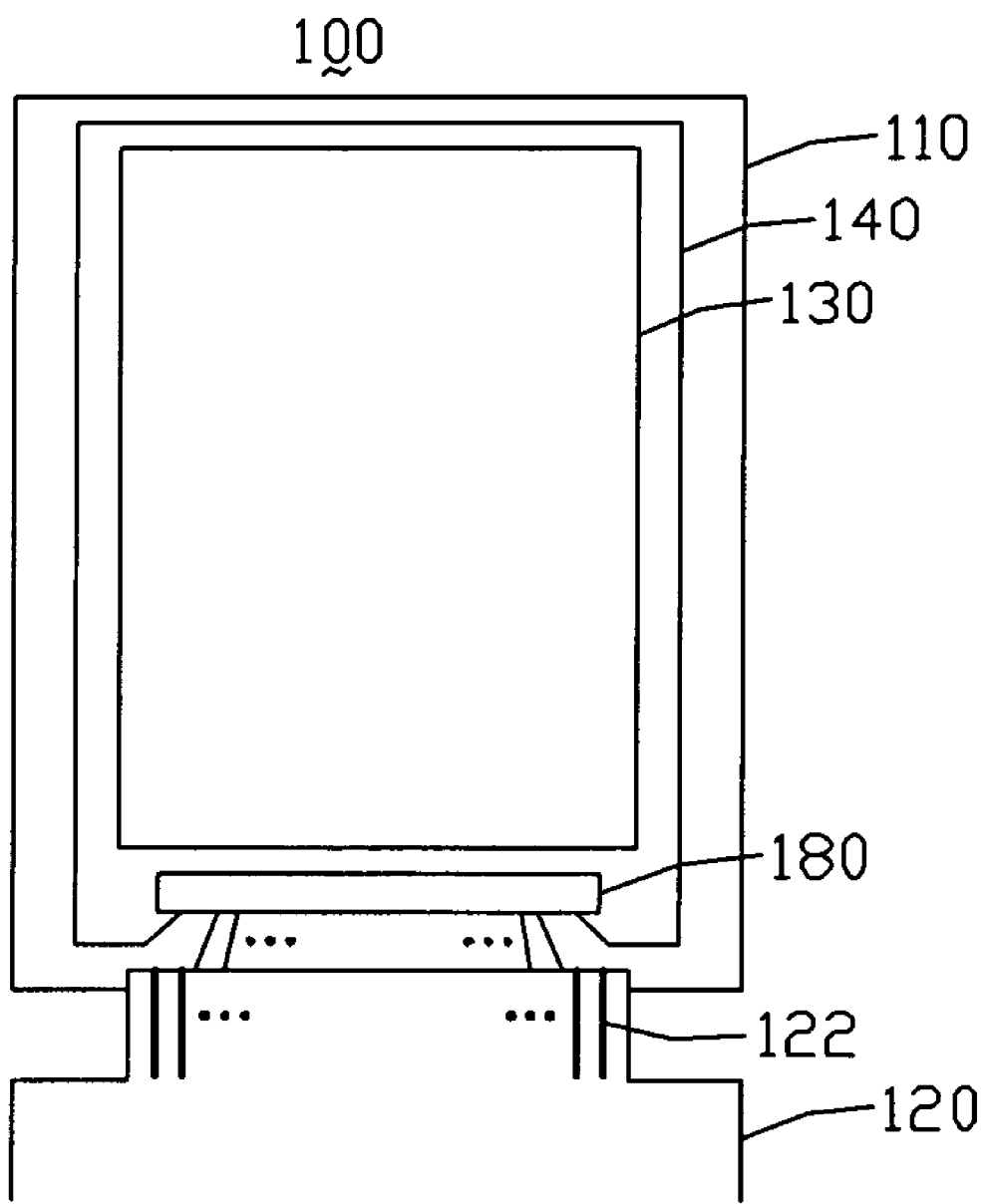
FIG. 6 is an abbreviated, planar view of a conventional liquid crystal display.

FIG. 5 is an abbreviated, enlarged view of an electrostatic discharge assistant structure 600 of a liquid crystal display according to a third embodiment of the present invention. The liquid crystal display in the third embodiment is similar to the liquid crystal display 200. However, the electrostatic discharge assistant structure 600 includes an electrostatic guiding line 640 and a protection line 670. The electrostatic guiding line 640 includes first guiding portion (not labeled). The first guiding portion includes a main body and a plurality of extending portions. The protection line 670 is a line parallel to the main body of the first guiding portion, and is disposed at an opposite side of the extending portions. The protection line 670 is configured to prevent exterior electrostatic charges from entering an active area of a liquid crystal panel.

It is to be further understood that even though numerous characteristics and advantages of preferred and exemplary embodiments have been set out in the foregoing description, together with details of the structures and functions of the embodiments, the disclosure is illustrative only; and that changes may be made in detail within the principles of the present invention to the full extent indicated by the broad general meaning of the terms in which the appended claims are expressed.

What is claimed is:

1. A liquid crystal display, comprising:
   a liquid crystal panel comprising an active area and a peripheral non-active area;
   a driver configured to drive the liquid crystal panel; and
   a flexible printed circuit board comprising at least one the ground line electrically coupled to the ground;
   wherein the non-active area comprises an electrostatic guiding line and a protection line, the electrostatic guiding line surrounds the active area, and is electrically coupled to the at least one the ground line via the driver; the protection line is adjacent to the electrostatic guiding line, and is electrically coupled to the at least one the ground line directly.

2. The liquid crystal display as claimed in claim 1, wherein the liquid crystal panel further comprises at least one electrostatic discharge assistant unit configured to provide a discharge assistant path for electrostatic charges, the at least one electrostatic discharge assistant unit is disposed between protection line and the electrostatic guiding line.

3. The liquid crystal display as claimed in claim 2, wherein the at least one electrostatic discharge assistant unit comprises a first diode and a second diode, a positive terminal of the first diode and a negative terminal of the second diode are electrically coupled to the protection line, and a negative terminal of the first diode and a positive terminal of the second diode are electrically coupled to the electrostatic guiding line.

4. The liquid crystal display as claimed in claim 3, wherein the at least one electrostatic discharge assistant unit comprises a selected one of a ring diode, a back-to-back diode, a metal-insulator-metal diode, and a ring thin film transistor.

5. The liquid crystal display as claimed in claim 1, wherein the protection line comprises a first main body and a plurality of first extending portions, the first extending portions extend toward the electrostatic guiding line from the first main body.

6. The liquid crystal display as claimed in claim 5, wherein each of the first extending portions comprises a first cusp end.

7. The liquid crystal display as claimed in claim 6, wherein the electrostatic guiding line comprises a second main body and a plurality of second extending portions, the second extending portions extend toward the protection line from the second main body.

8. The liquid crystal display as claimed in claim 7, wherein each of the second extending portions comprises a second cusp end, each second cusp end faces a respective first cusp end of the first extending portion of the protection line, the first and second cusp ends are configured for discharging electrostatic charges in the electrostatic guiding line to the protection line.

9. The liquid crystal display as claimed in claim 1, wherein the protection line is configured to prevent exterior electrostatic charges from entering the active area of the liquid crystal panel.

10. The liquid crystal display as claimed in claim 1, wherein the active area comprises a plurality of scanning lines, a plurality of data lines perpendicular to the scanning lines, and a plurality of pixel units defined by the crossing scanning lines and data lines.

11. The liquid crystal display as claimed in claim 10, wherein the electrostatic guiding line comprises a first guiding portion configured for discharging the electrostatic charges in scanning lines, the first guiding portion has a comb-like manner.

12. The liquid crystal display as claimed in claim 11, wherein the first guiding portion comprises a third main body and a plurality of third extending portions, each of the third extending portion extends towards the active area from the third main body.

13. The liquid crystal display as claimed in claim 12, wherein each of the third extending portions corresponds to a respective scanning line and comprises a third cusp end, each of the scanning lines comprises a fourth cusp end facing the third cusp end of the corresponding third extending portion.

14. The liquid crystal display as claimed in claim 10, wherein the electrostatic guiding line comprises a second guiding portion configured for discharging the electrostatic charges in data lines, the second guiding portion is electrically coupled to the first guiding portion, and has a comb-like manner.

15. The liquid crystal display as claimed in claim 14, wherein the second guiding portion comprises a fourth main body and a plurality of fourth extending portions, each of the fourth extending portion extends towards the active area from the fourth main body.

16. The liquid crystal display as claimed in claim 15, wherein each of the fourth extending portions corresponds to a data line and comprises a fifth cusp end, each of the data lines comprises a sixth cusp end facing the fifth cusp end of the corresponding fourth extending portion.

17. The liquid crystal display as claimed in claim 1, wherein the flexible printed circuit board further comprises a plurality of signal lines, the signal lines are configured for transmitting signals for the driver, the at least one the ground line comprises a pair of first ground lines, each of the first ground lines is disposed at an opposite side of the signal lines, and is electrically coupled to a respective end of the protection line.

18. The liquid crystal display as claimed in claim 17, wherein the at least one the ground line further comprises a second ground line, the driver comprises two electrostatic charge input pins and an electrostatic charge output pin, each of the electrostatic charge input pins is electrically coupled to a respective end of the electrostatic guiding line, and the electrostatic charge, output pin is electrically coupled to the second ground line.

19. A liquid crystal display, comprising:
a liquid crystal panel comprising an electrostatic guiding line and a protection line;
a driver configured to drive the liquid crystal panel; and
a flexible printed circuit board comprising at least one the ground line electrically coupled to the ground;
wherein the electrostatic guiding line and the protection line are both configured for discharging electrostatic charges in the liquid crystal panel; when the electrostatic charges are discharged, part of the electrostatic charges are transmitted to the at least one the ground line via the protection line and released to the ground; part of the electrostatic charges are transmitted to the at least one the ground line via both the electrostatic guiding line and are released to the ground.

* * * * *